(12) United States Patent
Freeman et al.

(10) Patent No.: US 8,088,004 B2
(45) Date of Patent: Jan. 3, 2012

(54) SYSTEM AND METHOD FOR IMPLEMENTING ENVIRONMENTALLY-SENSITIVE SIMULATIONS ON A DATA PROCESSING SYSTEM

(75) Inventors: David S. Freeman, Austin, TX (US); Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1104 days.

(21) Appl. No.: 11/872,765

(22) Filed: Oct. 16, 2007

(65) Prior Publication Data

US 2009/0099822 A1    Apr. 16, 2009

(51) Int. Cl.
   *A63F 13/00*   (2006.01)
   *A63F 9/24*    (2006.01)
   *G06F 17/00*   (2006.01)
   *A63F 13/10*   (2006.01)

(52) U.S. Cl. ............... 463/36; 463/30; 463/31; 463/42; 273/461; 250/332; 250/338.1; 345/101; 345/419; 345/473; 345/636; 434/43; 434/118

(58) Field of Classification Search .............. 463/1–5, 463/7–9, 30–34, 36–39, 40–43, 49–57, 101; 273/108.1, 127 R, 148 R, 148 B, 309, 317.1, 273/340, 343, 348, 361–367, 461; 250/205, 250/330–334, 338.1, 339.02, 339.06, 339.09, 250/339.11, 339.14, 341.8, 342, 344–345, 250/350–351, 353; 345/1.1–1.3, 2.1–2.3, 345/3.1–3.4, 24, 419, 467–469, 473, 539, 345/543–544, 625, 636, 638, 653–656, 664–666, 345/682–683, 686, 949–950, FOR. 139, FOR. 153; 348/14.15, 39, 42, 47–52, 115, 117, 121, 135–137, 141, 211.2, 211.4, 211.7–211.8, 211.14, 211.99, 576, 588–589, 719, 721, 734, E13.004, E13.064–E13.067; 375/240.15–240.16, 240.25; 398/106–108, 111–112, 118, 123, 127–131; 434/37–38, 43–44, 69, 118, 240, 256–257

See application file for complete search history.

(56) References Cited

U.S. PATENT DOCUMENTS

| | | | | |
|---|---|---|---|---|
| 5,831,686 A | * | 11/1998 | Beretta | 348/602 |
| 6,061,071 A | * | 5/2000 | Kawai et al. | 345/473 |
| 6,361,436 B1 | * | 3/2002 | Gouji et al. | 463/7 |
| 6,606,115 B1 | * | 8/2003 | Alicandro et al. | 348/164 |
| 6,900,729 B2 | * | 5/2005 | Paximadis et al. | 340/565 |
| 7,025,675 B2 | * | 4/2006 | Fogel et al. | 463/9 |
| 7,044,856 B2 | * | 5/2006 | Suzuki | 463/31 |

(Continued)

FOREIGN PATENT DOCUMENTS

JP    2004145419 A    *    5/2004

*Primary Examiner* — Arthur O. Hall
(74) *Attorney, Agent, or Firm* — Yudell Isidore Ng Russell PLLC

(57) ABSTRACT

A system and method for implementing environmentally-sensitive simulations on a data processing system. According to an embodiment of the present invention, an ambient temperature associated with a player's location is provided to an environmental module. The environmental module provides the ambient temperature information to a simulation application. The simulation application modifies the behavior of a simulation executing on the data processing system according to the ambient temperature. The data processing system displays the simulation with the modified behavior to the player.

2 Claims, 3 Drawing Sheets

U.S. PATENT DOCUMENTS

| | | | |
|---|---|---|---|
| 7,089,497 B2 * | 8/2006 | Abbott et al. | 715/740 |
| 7,542,816 B2 * | 6/2009 | Rosenberg | 700/94 |
| 7,606,375 B2 * | 10/2009 | Bailey et al. | 381/63 |
| 7,636,365 B2 * | 12/2009 | Chang et al. | 370/401 |
| 7,789,758 B2 * | 9/2010 | Wright | 463/42 |
| 7,803,048 B2 * | 9/2010 | Tilston et al. | 463/31 |
| 2002/0082077 A1 * | 6/2002 | Johnson et al. | 463/30 |
| 2004/0224740 A1 * | 11/2004 | Ball et al. | 463/6 |
| 2007/0184899 A1 * | 8/2007 | Rantapuska | 463/30 |
| 2007/0282783 A1 * | 12/2007 | Singh | 707/1 |
| 2008/0267467 A1 * | 10/2008 | Sokulin et al. | 382/128 |
| 2010/0046744 A1 * | 2/2010 | Rhoads et al. | 380/28 |

* cited by examiner

SYSTEM AND METHOD FOR IMPLEMENTING ENVIRONMENTALLY-SENSITIVE SIMULATIONS ON A DATA PROCESSING SYSTEM

BACKGROUND OF THE INVENTION

1. Technical Field

The present invention relates in general to the field of data processing system and in particular, the field of processing data within data processing systems. Still more specifically, the present invention relates to the field of entertainment and simulation applications utilizing data processing systems.

2. Description of the Related Art

With the rapid advance of computer technology, some of the most lucrative and popular applications include video games and simulations. With each successive generation of computer hardware, video game and simulation developers seek to generate a progressively more immersive gaming and/or simulation experience for the user.

SUMMARY OF THE INVENTION

The present invention includes a system and method for implementing environmentally-sensitive simulations on a data processing system. According to an embodiment of the present invention, an ambient temperature associated with a player's location is provided to an environmental module. The environmental module provides the ambient temperature information to a simulation application. The simulation application modifies the behavior of a simulation executing on the data processing system according to the ambient temperature. The data processing system displays the simulation with the modified behavior to the player.

The above, as well as additional objectives, features, and advantages of the present invention, will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN EMBODIMENT

Figure 1:
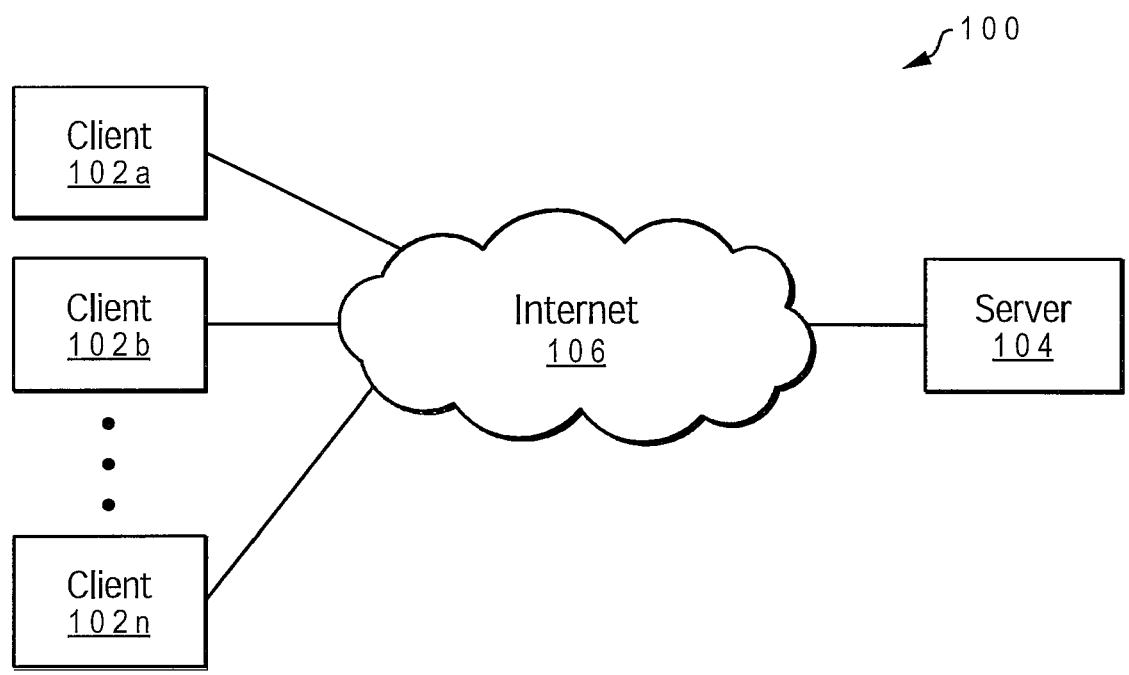
FIG. 1 is a pictorial representation of an exemplary network in which an embodiment of the present invention may be implemented.

Referring now to the figures, and in particular, referring to FIG. 1, there is illustrated a block diagram depicting an exemplary network 100 in which an embodiment of the present invention may be implemented. As depicted, network 100 includes a collection of clients 102*a*-102*n*, Internet 106, and server 104. Clients 102*a*-102*n* are coupled to server 106 via Internet 104. While Internet 104 is utilized to couple clients 102*a*-102*n* to server 106, those with skill in the art will appreciate that a local-area network (LAN) or wide-area network (WAN) utilizing Ethernet, IEEE 802.11x, or any other communications protocol may be utilized. Clients 102*a*-102*n* and server 106 are discussed herein in more detail in conjunction with FIG. 2.

According to an embodiment of the present invention, clients 102*a*-102*n* may be implemented as client computer systems that connect to server 104 to launch a simulation and/or video game. The simulation and/or video game may be limited to single-user game play or include multiplayer game play options. Also, according to an embodiment of the present invention, clients 102*a*-102*n* may utilize a browser stored in system memory to send and receive information to and from server 104. The information may include e-mails, web pages, and the like. Those with skill in the art will appreciate that exemplary network 100 may include other components such as routers, firewalls, etc. that are not germane to the discussion of the present network and will not be discussed further herein.

Figure 2:
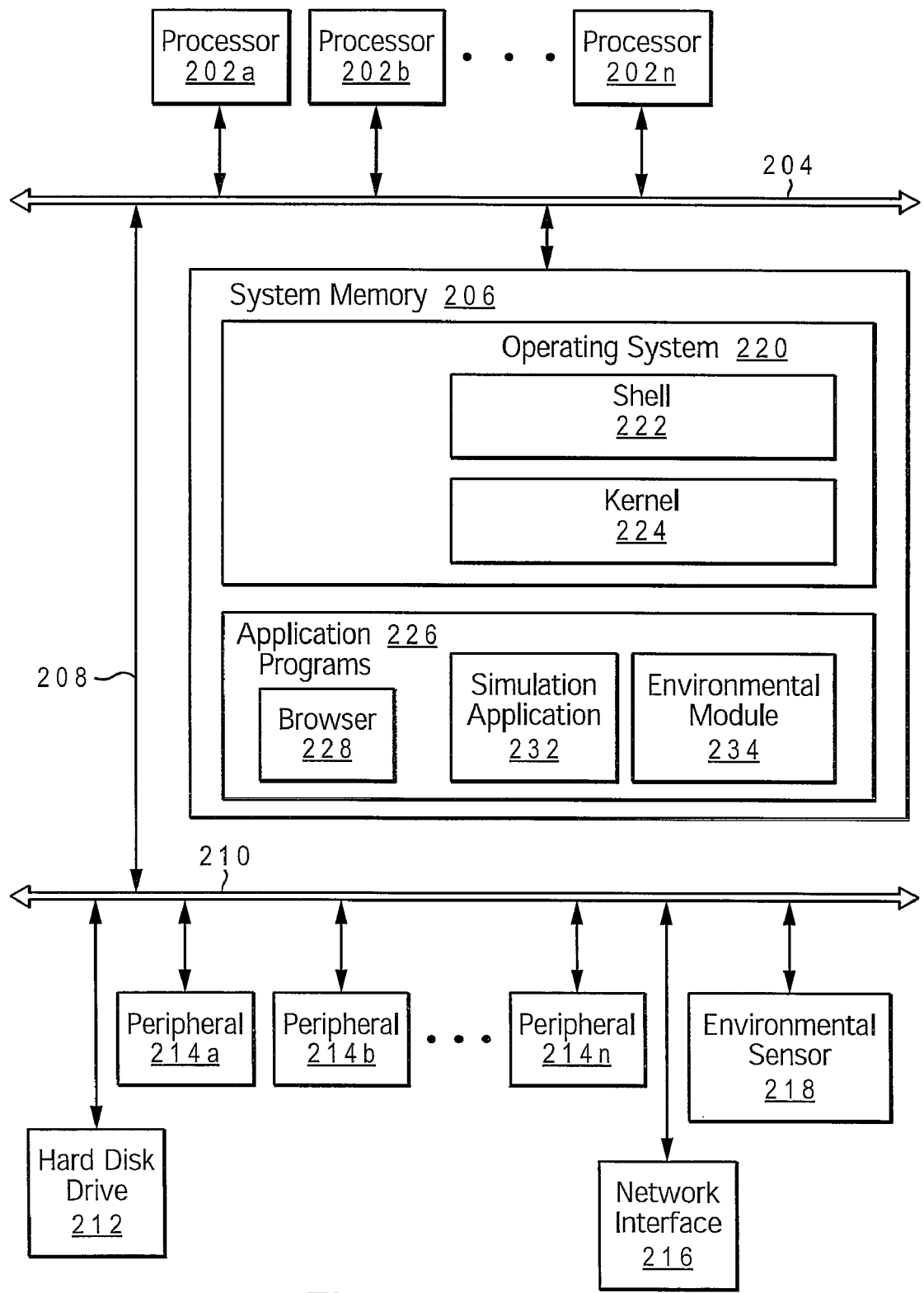
FIG. 2 depicts an exemplary data processing system in which an embodiment of the present invention may be implemented.

FIG. 2 is a block diagram depicting an exemplary data processing system 200, which may be utilized to implement clients 102*a*-102*n* and server 104 as shown in FIG. 1. Those with skill in the art will appreciate that data processing system 200 may be implemented as, but not limited to, a computer workstation, game console, portable gaming system, portable phone, etc. As illustrated, exemplary data processing system 200 includes a collection of processors 202*a*-202*n* that is coupled to a system memory 206 via a system bus 204. System memory 206 may be implemented by dynamic random access memory (DRAM) modules or any other type of random access memory (RAM) module. Mezzanine bus 208 couples system bus 204 to peripheral bus 210. Coupled to peripheral bus 210 is a hard disk drive 212 for mass storage and a collection of peripherals 214*a*-214*n*, which may include, but are not limited to, optical drives, other hard disk drives, printers, and input devices, and the like. Network interface 216 enables data processing system 200 to communicate on a network, such as, but not limited to Internet 106. Environmental sensor 218, discussed herein in more detail in conjunction with FIG. 3, measures various aspects of the user's environment including, but not limited to ambient light, sound, and temperature, and relays the information to environmental module 234. Environmental module 234 sends the information measured by environmental sensor 218 to simulation application 232, which in turn, affects the simulation environment, thus providing a more realistic simulation experience for the user. According to an embodiment of the present invention, in the case of a temperature-dependant game, environmental sensor 218 may be implemented as a thermometer, which could measure temperature using electrical resistance, a thermocouple, the expansion of a liquid such as mercury, or any other technique known to those skilled in the art.

Included in system memory 206 is operating system 220, which further includes a shell 222 (as it is called in the UNIX® operating system. UNIX® is a registered trademark of The Open Group in the United States and other countries), for providing transparent user access to resources such as application programs 226. Generally, shell 222, also called a command processor in Microsoft® Windows® operating system, is the highest level of the operating system software hierarchy and serves as a command interpreter. Microsoft® and Windows® are trademarks of Microsoft Corporation in the United States, other countries, or both. Shell 222 provides a system prompt, interprets commands entered by keyboard, mouse, or other input media, and sends the interpreted command(s) to the appropriate lower levels of the operating system (e.g., kernel 224) for processing. Note that while shell 222 is a text-based, line-oriented user interface, the present invention will support other user interface modes, such as graphical, voice, gestural, etc. equally well.

As illustrated, operating system 220 also includes kernel 224 which includes lower levels of functionality for operating system 220 and application programs 226, including memory management, process and task management, disk management, and mouse and keyboard management. Application programs 226 can include browser 228, utilized for access to Internet 106 (FIG. 1), word processors, spreadsheets, and other application programs. Also, as depicted, system memory 206 includes simulation application 232 and environmental module 234. As discussed herein in more detail, simulation application 232 may be implemented by any type of simulator (e.g., flight, driving, role-playing game, virtual reality, etc.) and/or video game.

One feature of simulators and/or video games is that simulator and/or video game developers attempt to provide as much of an immersive experience for the user as possible. Most developers have concentrated on providing increasingly realistic graphics and sounds in their simulations and/or video games.

According to an embodiment of the present invention, environmental module 234 retrieves data from environmental sensor 218. Environmental module 234 sends the information measured by environmental sensor 218 to simulation application 232, which in turn, affects the simulation environment, thus providing a more realistic simulation experience for the user.

Figure 3:
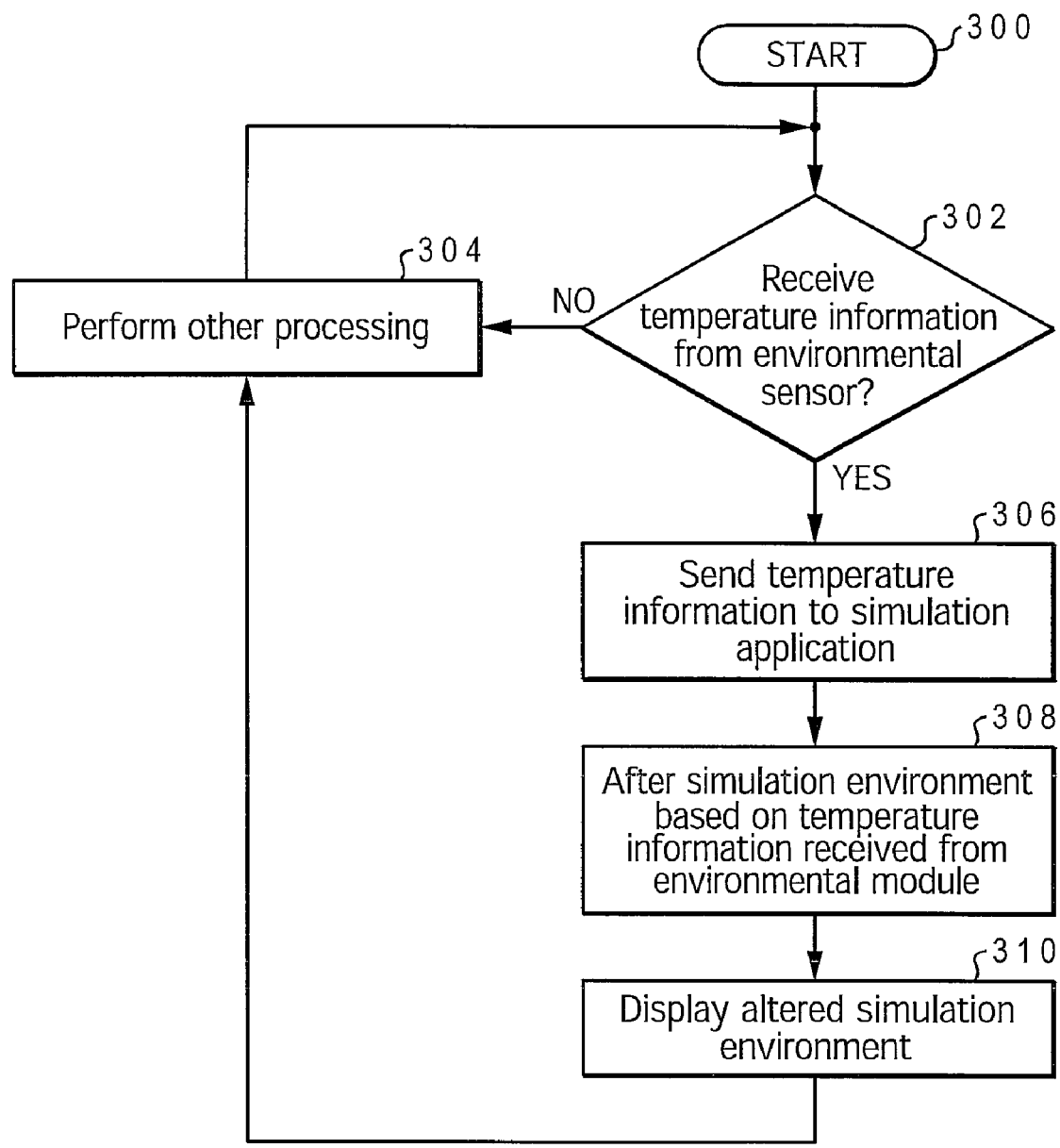
FIG. 3 is a high-level logical flowchart diagram illustrating an exemplary method for implementing environmentally-sensitive simulations on a data processing system according to an embodiment of the present invention.

FIG. 3 is a high-level logical flowchart illustrating an exemplary method for implementing environmentally-sensitive simulations on a data processing system according to an embodiment of the present invention. The process begins at step 300, and proceeds to step 302, which illustrates environmental module 234 determining if temperature information has been received from environmental sensor 218. According to an embodiment of the present invention, the temperature information is a temperature of the area surrounding environmental sensor 218 such as the room in which the user is running the simulation and/or video game. If no temperature information has been received, the process continues to step 304, which depicts data processing system 200 performing other processing. The process returns to step 302.

If temperature information has been received from environmental sensor 218, the process continues to step 306, which illustrates environmental module 234 sending the temperature information to simulation application 232. The process proceeds to step 308, which depicts simulation application 232 altering the simulation environment presented to the user based on temperature information received from environmental module 234. For example, if the measured temperature in the room is 70° Fahrenheit, the simulation environment in the simulation and/or video game may be depicted to the user as a comfortable spring day. Or, in another embodiment of the present invention, if the measured temperature in the room is 110° Fahrenheit, the simulation environment in the simulation and/or video game may be depicted to the user as being very hot, with grass wilting and a sandstorm brewing in the distance. The playable character in the simulation and/or video game may be dressed differently (e.g., winter coat, shorts, ski jacket, etc.) depending on the measure temperature information. The storyline of the simulation and/or video game may be changed depending on the measured temperature. For example, if a temperature measurement is low, the simulation and/or video game environment may include snow, which can affect the storyline (e.g., in a wargame some areas might become impassable due to the snow). The adversaries faced by the player may be different, be dressed differently and/or react differently based on the measured temperature information. For example, a hot environment might include Caribbean pirates whereas a cold environment at the same point in the story Vikings.

In another embodiment of the present invention, the temperature information does not have to be provided by environmental sensor 218, but such temperature information can be entered by a user or downloaded from another location on the Internet such as a weather website.

The process continues to step 310, which illustrates data processing system 200 displaying the altered simulation environment from simulation application 232 to the user. The process returns to step 304, which depicts data processing system 200 performing other processing.

As discussed, the present invention includes a system and method for implementing environmentally-sensitive simulations on a data processing system. According to an embodiment of the present invention, an ambient temperature associated with a player's location is provided to an environmental module. The environmental module provides the ambient temperature information to a simulation application. The simulation application modifies the behavior of a simulation executing on the data processing system according to the ambient temperature. The data processing system displays the simulation with the modified behavior to the player.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to random access memory (RAM), and communication media, such as computer networks and telephone networks, including Ethernet, the Internet, wireless networks, and like networks. It should be understood, therefore, that such signal-bearing media, when carrying or encoding computer-readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made herein without departing from the spirit and scope of the invention.

What is claimed is:

1. A computer implemented method for implementing environmentally-sensitive simulations on a data processing system, said computer implemented method comprising:

in response to continuing receipt of an ambient temperature information obtained by an environmental sensor disposed within a player's room, sending said ambient temperature information in real-time to a simulation application being executed within a data processing system, wherein said simulation application is a video game, wherein said ambient temperature information is also received from a weather information depository via a network to which said data processing system is connected;

continuously altering attributes of a background and any playable game characters within said background of a simulated environment generated by said simulation application being executed within said data processing system according to said ambient temperature information obtained in real-time so as to change the storyline of said simulated environment in real-time in said video game; and displaying in real-time said simulated environment having said background and said playable game characters in said altered attributes on a display to said player.

2. A data processing system comprising:

a processor;

an environmental sensor coupled to said processor via an interconnect, wherein said environmental sensor continuously obtains ambient temperature information within a player's room in real-time, wherein said ambient temperature information is also received from a weather information depository via a network to which said data processing system is connected;

a system memory coupled to said processor via said interconnect, wherein said system memory includes a simulation application that continuously receives said ambient temperature information from said environmental sensor and continuously alters attributes of a background and any playable game characters within said background in a simulated environment generated by said simulation application according to said ambient temperature information in real-time so as to change the storyline of said simulated environment in real-time in a video game, wherein said simulation application is a video game; and a display configured to display in real-time said simulated environment having said background and said playable game characters in said altered attributes to said player.

* * * * *